(12) United States Patent
Sanders et al.

(10) Patent No.: US 11,490,576 B2
(45) Date of Patent: Nov. 8, 2022

(54) MODULAR KINEMATIC AND TELEMETRY SYSTEM FOR AN IRRIGATION SYSTEM

(71) Applicant: Heartland Ag Tech, Inc., Hancock, WI (US)

(72) Inventors: Russell Sanders, Minnetonka, MN (US); Jeremie Pavelski, Wisconsin Rapids, WI (US)

(73) Assignee: HEARTLAND AG TECH, INC., Hancock, WI (US)

( * ) Notice: Subject to any disclaimer, the term of this patent is extended or adjusted under 35 U.S.C. 154(b) by 0 days.

(21) Appl. No.: 17/559,199

(22) Filed: Dec. 22, 2021

(65) Prior Publication Data

US 2022/0192111 A1 Jun. 23, 2022

Related U.S. Application Data

(60) Provisional application No. 63/129,230, filed on Dec. 22, 2020.

(51) Int. Cl.
*A01G 25/16* (2006.01)
*F16L 37/088* (2006.01)
(Continued)

(52) U.S. Cl.
CPC .............. *A01G 25/16* (2013.01); *B29C 66/51* (2013.01); *F16L 33/00* (2013.01); *F16L 37/00* (2013.01);
(Continued)

(58) Field of Classification Search
CPC .... G01D 11/30; G01D 11/245; G21C 17/017; G01N 29/265; G01B 5/0002;
(Continued)

(56) References Cited

U.S. PATENT DOCUMENTS 4,015,366 A * 4/1977 Hall, III ................... A01G 3/04
 193/25 E
4,249,698 A * 2/1981 Smith ................. A01G 25/092
 239/DIG. 1
(Continued)

FOREIGN PATENT DOCUMENTS

WO 2009002757 A2 12/2008
WO 2011156651 A1 12/2011
WO 2019216975 A1 11/2019

OTHER PUBLICATIONS

Derrel Martin et al., Center Pivot Irrigation Handbook, Feb. 2017, pp. 136 (Year: 2017).*
(Continued)

*Primary Examiner* — Clayton E. LaBalle
*Assistant Examiner* — Kevin C Butler
(74) *Attorney, Agent, or Firm* — Carter, Deluca & Farrell LLP

(57) ABSTRACT

A modular kinematic and telemetry system for an irrigation system includes a condition-based monitoring (CBM) system and a plurality of sets of modular foot assemblies. The CBM system has a housing and supports a plurality of kinematic and telemetry components. The plurality of sets of modular foot assemblies includes a first set and a second set that secure to the housing of the CBM system. The first set is configured to secure the CBM system to a first end gun configuration and the second set is configured to secure the CBM system to a second end gun configuration that is different from the first end gun configuration.

20 Claims, 13 Drawing Sheets

(51) Int. Cl.
    *B29C 65/00*     (2006.01)
    *F16L 33/00*     (2006.01)
    *F16L 37/00*     (2006.01)
    *F16L 55/00*     (2006.01)
    *F16L 55/172*     (2006.01)
    *F16M 13/02*     (2006.01)
    *G01D 11/24*     (2006.01)
    *G01D 11/30*     (2006.01)
    *G01N 29/265*     (2006.01)
    *G21C 17/017*     (2006.01)
    *G01B 5/00*     (2006.01)

(52) U.S. Cl.
    CPC ........... *F16L 37/0885* (2019.08); *F16L 55/00* (2013.01); *F16L 55/172* (2013.01); *F16M 13/02* (2013.01); *G01B 5/0002* (2013.01); *G01D 11/245* (2013.01); *G01D 11/30* (2013.01); *G01N 29/265* (2013.01); *G21C 17/017* (2013.01); *G05B 2219/2625* (2013.01)

(58) Field of Classification Search
    CPC ...... A01G 25/16; F16L 37/0885; F16L 33/00; F16L 37/00; F16L 55/00; F16L 55/172; B29C 66/51; F16M 13/02
    USPC .............. 73/866.5; 248/475.1, 348, 126–200
    See application file for complete search history.

(56) References Cited

U.S. PATENT DOCUMENTS

| | | | | |
|---|---|---|---|---|
| 4,961,538 A * | 10/1990 | Hewitt | ................... | F16K 1/221 239/582.1 |
| 5,927,603 A * | 7/1999 | McNabb | .............. | A01G 25/167 239/69 |
| 9,052,240 B2 * | 6/2015 | Elke | ......... | G01K 7/02 |
| 9,279,520 B2 * | 3/2016 | Korus | ................ | F16L 23/0286 |
| 9,428,870 B2 * | 8/2016 | Zavitz | .................... | E21B 19/14 |
| 9,683,680 B1 * | 6/2017 | Korus | ................ | F16L 3/12 |
| 9,874,489 B1 * | 1/2018 | Jerphagnon | ............ | G01M 3/04 |
| 10,320,173 B2 * | 6/2019 | Dalisay | ................. | H02G 3/263 |
| 10,384,557 B2 | 8/2019 | Abts et al. | | |
| 10,787,817 B1 * | 9/2020 | Bilge | ................. | E04F 13/12 |
| 10,954,105 B1 * | 3/2021 | Pahlke | ................. | B66B 25/003 |
| D935,423 S * | 11/2021 | Schemmel | ............... | H01H 3/02 D15/28 |
| 11,236,858 B1 * | 2/2022 | Rigby | ................... | F16B 5/0685 |
| 2004/0069912 A1 * | 4/2004 | Healy | ................... | A01G 25/09 248/229.16 |
| 2005/0006535 A1 * | 1/2005 | Brown | ................... | H02G 3/32 248/70 |
| 2006/0027677 A1 * | 2/2006 | Abts | .................... | A01G 25/092 239/69 |
| 2008/0046130 A1 * | 2/2008 | Faivre | .................. | A01G 25/092 239/728 |
| 2008/0290234 A1 * | 11/2008 | Cho | ........................ | F22B 1/284 248/231.9 |
| 2010/0032493 A1 * | 2/2010 | Abts | ..................... | A01G 25/092 239/11 |
| 2010/0032495 A1 * | 2/2010 | Abts | ..................... | A01G 25/092 239/69 |
| 2010/0282937 A1 * | 11/2010 | Schnoor | ................... | H02G 3/32 248/225.21 |
| 2011/0303456 A1 * | 12/2011 | Blanchard | ............... | F16L 3/222 248/68.1 |
| 2012/0048960 A1 * | 3/2012 | Malsam | ............... | A01G 25/092 239/71 |
| 2013/0211717 A1 * | 8/2013 | Abts | ...................... | A01G 25/16 701/485 |
| 2014/0020224 A1 * | 1/2014 | Heims | ................... | F16L 3/2431 248/71 |
| 2014/0110498 A1 * | 4/2014 | Nelson | ................... | B05B 3/021 239/69 |
| 2015/0285405 A1 * | 10/2015 | Bajracharya | ............ | F16L 3/133 248/70 |
| 2016/0208958 A1 * | 7/2016 | Kawauchi | ............... | B08B 9/023 |
| 2017/0055469 A1 * | 3/2017 | Abts | ..................... | A01G 25/092 |
| 2017/0349060 A1 * | 12/2017 | Abts | ..................... | A01G 25/092 |
| 2017/0352010 A1 * | 12/2017 | Son | ........................ | F03D 7/048 |
| 2018/0094953 A1 * | 4/2018 | Colson | ................... | G01D 9/005 |
| 2018/0284758 A1 * | 10/2018 | Cella | .................... | G05B 23/0297 |
| 2018/0348714 A1 * | 12/2018 | Larue | ..................... | A01G 25/16 |
| 2019/0064791 A1 * | 2/2019 | Cella | .................... | G06N 5/046 |
| 2019/0124859 A1 * | 5/2019 | Larue | .................... | G06V 20/188 |
| 2019/0297796 A1 * | 10/2019 | Gerdes | ................. | A01G 25/167 |
| 2019/0297799 A1 * | 10/2019 | LaRue | ..................... | C05G 3/70 |
| 2019/0324439 A1 * | 10/2019 | Cella | .................... | G06N 3/0445 |
| 2019/0339688 A1 * | 11/2019 | Cella | .................... | G05B 23/0229 |
| 2020/0023395 A1 * | 1/2020 | Tangen | .................. | B05B 12/006 |
| 2020/0103894 A1 * | 4/2020 | Cella | .................... | G05B 19/41865 |
| 2020/0154655 A1 | 5/2020 | Dick et al. | | |
| 2020/0187433 A1 * | 6/2020 | Redden | ................... | A01M 7/0089 |
| 2020/0404835 A1 * | 12/2020 | Kastl | .................... | A01C 23/047 |
| 2021/0076579 A1 * | 3/2021 | Thatcher | .............. | A01G 25/092 |
| 2021/0147187 A1 * | 5/2021 | Pahlke | .................. | B66B 25/006 |
| 2021/0147188 A1 * | 5/2021 | Pahlke | .................. | G10L 25/51 |
| 2021/0147189 A1 * | 5/2021 | Pahlke | .................. | H04W 4/80 |
| 2021/0147190 A1 * | 5/2021 | Pahlke | .................... | B66B 21/04 |
| 2021/0169025 A1 * | 6/2021 | Burgard | ................. | A01G 25/09 |
| 2022/0030783 A1 * | 2/2022 | Moeller | ............... | A01G 25/167 |
| 2022/0030785 A1 * | 2/2022 | Miller | .................. | A01G 25/16 |
| 2022/0039336 A1 * | 2/2022 | Miller | .................. | A01B 69/008 |
| 2022/0039337 A1 * | 2/2022 | Miller | .................... | G01B 21/24 |
| 2022/0039339 A1 * | 2/2022 | Citurs | .................. | A01G 25/162 |

OTHER PUBLICATIONS

International Search Report and Written Opinion for PCT/US2021/064873 dated Apr. 12, 2022.

* cited by examiner

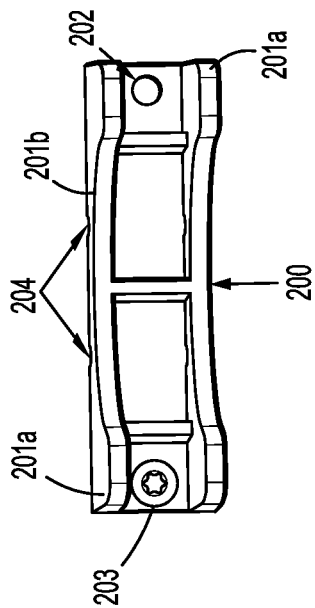
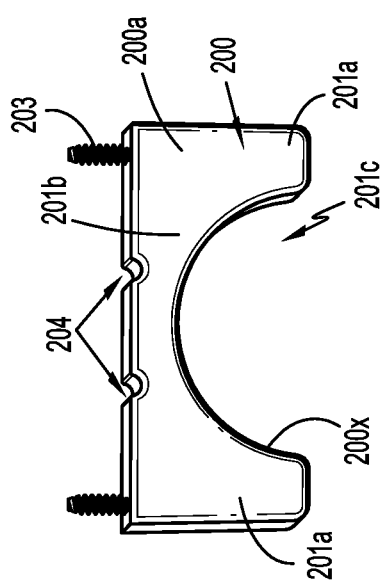

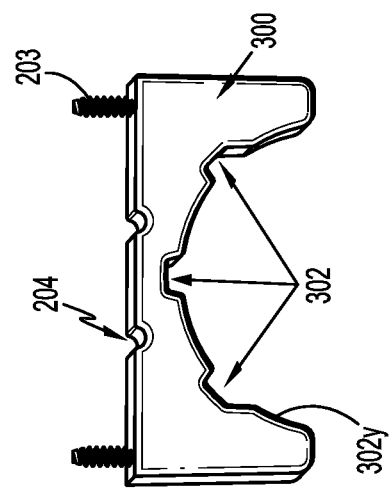
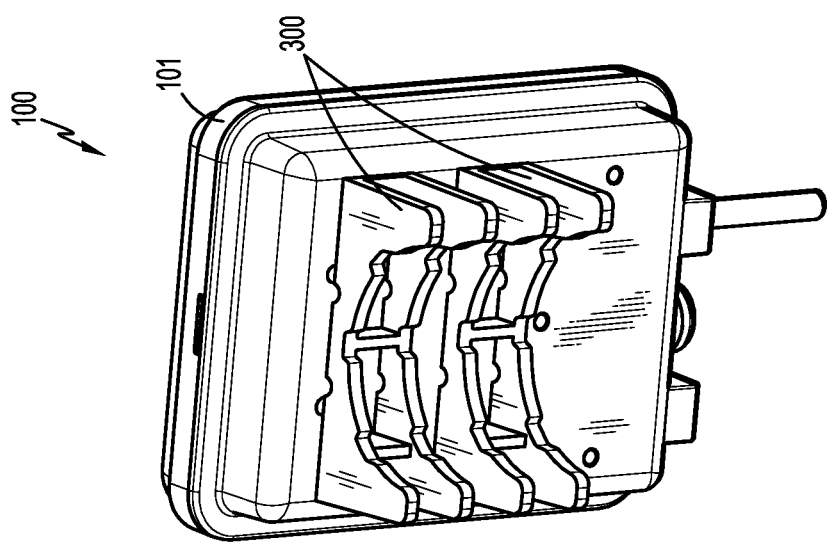
FIG. 12
FIG. 11

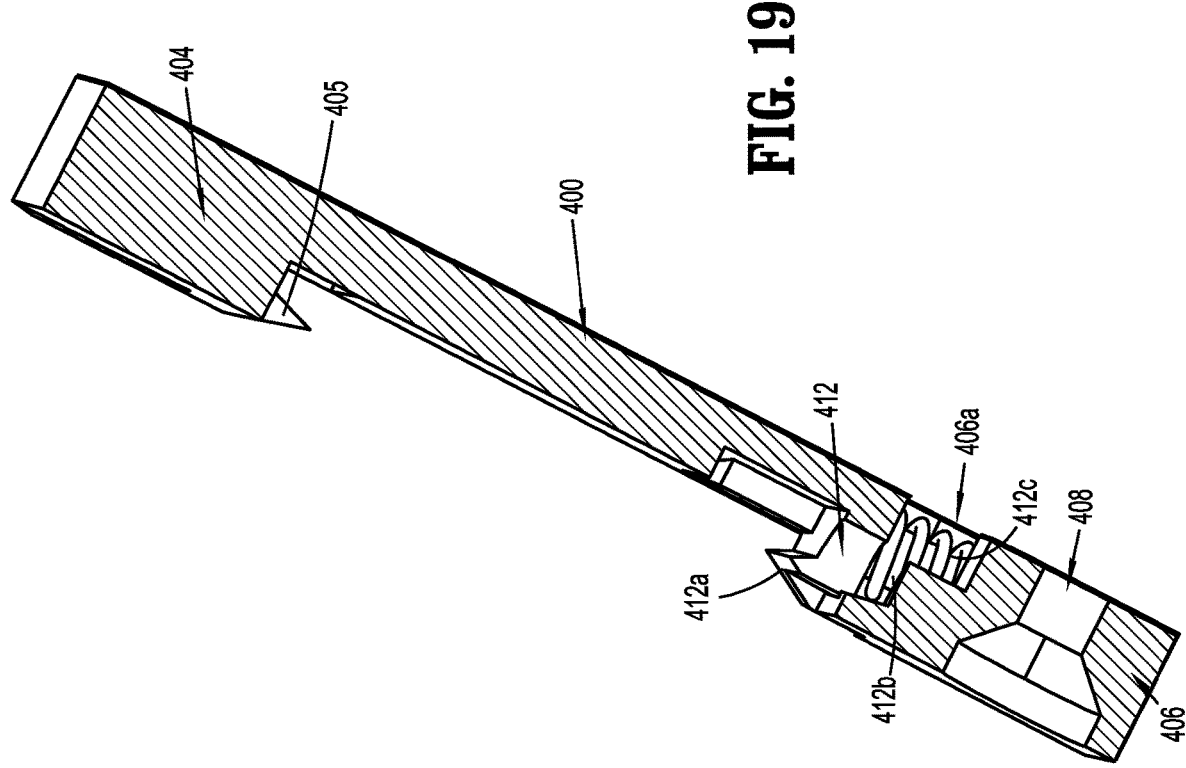

MODULAR KINEMATIC AND TELEMETRY SYSTEM FOR AN IRRIGATION SYSTEM

CROSS REFERENCE TO RELATED APPLICATIONS

This application claims the benefit of U.S. Provisional Patent Application Ser. No. 63/129,230, filed Dec. 22, 2020, the entire contents of which are hereby incorporated herein by reference.

TECHNICAL FIELD

This disclosure relates to irrigation systems and, more particularly, to structures and methods for effectuating predictive maintenance of irrigation systems.

BACKGROUND

Irrigation systems such as pivots, lateral move systems, drip irrigation systems, etc. which may include stationary or attached endgun systems, breakdown on average three times per year out of 40 uses. These breakdowns occur during critical growing steps and in many cases in the middle of the field.

SUMMARY

To limit delays, increased costs and other problems associated with irrigation system breakdown, this disclosure details a solution including digital observation of the irrigation system during normal operation and set parameters that indicate abnormal operation. To observe these operational anomalies, sensors may be added to the irrigation system to provide data for algorithms to process. These algorithms may be logic or analytics based. Existing operational data from off the shelf may be used in some cases. In aspects, other data sources may be external to the system such as National Oceanic and Atmospheric Administration (NOAA) weather, topographical maps, soil moisture, etc., or combinations thereof.

According to one aspect, a modular kinematic and telemetry system for an irrigation system includes a condition-based monitoring (CBM) system and a plurality of sets of modular foot assemblies. The CBM system has a housing and supports a plurality of kinematic and telemetry components. The plurality of sets of modular foot assemblies includes a first set and a second set that secure to the housing of the CBM system. The first set is configured to secure the CBM system to a first end gun configuration and the second set is configured to secure the CBM system to a second end gun configuration that is different from the first end gun configuration.

In aspects, the first set may have a first configuration and the second set may have a second configuration. The first and second configurations may be different. The first set may include at least two foot assemblies. Each foot assembly may include a body portion having a plurality of legs coupled together by bridge. The body portion may include an arch that defines a central passage through the body portion. The central passage may be configured to conform to an outer surface of an end gun of the irrigation system for supporting the CBM system on the end gun. The bridge may define at least one notch therein. The at least one notch may include an outer notch defined in an outer surface of the bridge. The at least one notch may include an inner notch defined in an inner surface of the bridge that defines the arch of the bridge.

In aspects, the second set may include a plate having a first end portion and a second end portion on opposite ends of the plate. The first end portion may have a fixed tooth assembly and the second end portion may have an actuatable tooth assembly. The actuatable tooth assembly may include a tooth bar that is movable relative to the second end portion of the plate between an extended position and a retracted position to selectively secure the CBM system to an end gun of the irrigation system.

In aspects, the plurality of sets of modular foot assemblies may further include a third set that is different than the first and second sets. The first, second, and third sets may each be selectively securable to the CBM system via fasteners. The CBM system may be configured to support only one of the first, second, or third sets at a given time for selectively securing the CBM system to an end gun of the irrigation system. The first set may conform to the end gun when the end gun has a first configuration, the second set may conform to the end gun when the end gun has a second configuration, and the third set may conform to the end gun when the end gun has a third configuration.

According to one aspect of this disclosure, a modular kinematic and telemetry system includes a first modular foot assembly, a second modular foot assembly, and a condition-based monitoring (CBM) system. The first modular foot assembly is configured to couple to a first end gun. The second modular foot assembly has a different configuration than the first modular foot assembly and is configured to couple to a second end gun that has a different configuration than the first end gun. The CBM system has a housing, the housing having an upper housing portion and a lower housing portion that support a plurality of kinematic and telemetry components therebetween. The CBM system may be configured to couple to only one of the first or second modular foot assemblies at a given time for selectively securing the CBM system to one of the first or second end guns at the given time.

In aspects, the first modular foot assembly includes a body portion having a plurality of legs coupled together by bridge.

In aspects, the second modular foot assembly may include a plate having a first end portion and a second end portion on opposite ends of the plate. The first end portion may have a fixed tooth assembly and the second end portion may have an actuatable tooth assembly. The actuatable tooth assembly may include a tooth bar that is movable relative to the second end portion of the plate between an extended position and a retracted position.

According to yet another aspect, this disclosure is directed to a method for enabling a condition-based monitoring (CBM) system to be secured to a first end gun or a second end gun with a different configuration than the first end gun. The method includes selecting a foot assembly of a plurality of different foot assemblies based on an end gun configuration of the first end gun, selectively securing the selected foot assembly to the CBM system, and selectively mounting the selected foot assembly onto the first end gun to secure the CBM system to the first end gun.

In aspects, selectively securing the selected foot assembly to the CBM system may include fastening the selected foot assembly to a housing of the CBM system.

Other aspects, features, and advantages will be apparent from the description, the drawings, and the claims that follow.

BRIEF DESCRIPTION OF DRAWINGS

The accompanying drawings, which are incorporated in and constitute a part of this specification, illustrate aspects of the disclosure and, together with a general description of the disclosure given above and the detailed description given below, explain the principles of this disclosure, wherein:

FIGS. 7-10 are perspective views of a foot assembly of the modular kinematic and telemetry system of FIG. 3;

FIG. 11 is a bottom, perspective view of another modular kinematic and telemetry system of the end gun system of FIG. 2;

FIGS. 12-15 are perspective views of a foot assembly of the modular kinematic and telemetry system of FIG. 11;

FIG. 19 is a cross-sectional view of FIG. 18 as taken along section line 19-19 of FIG. 18.

DETAILED DESCRIPTION

Figure 1:
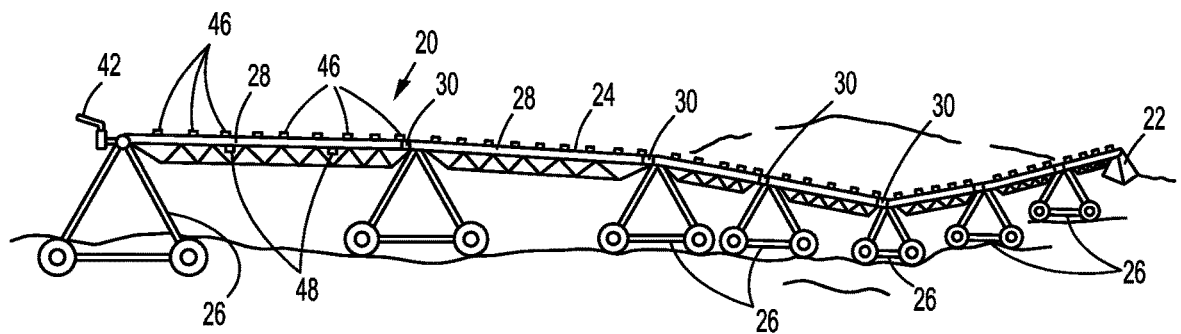
FIG. 1 is a perspective view of an irrigation system in accordance with the principles of this disclosure.
Figure 2:
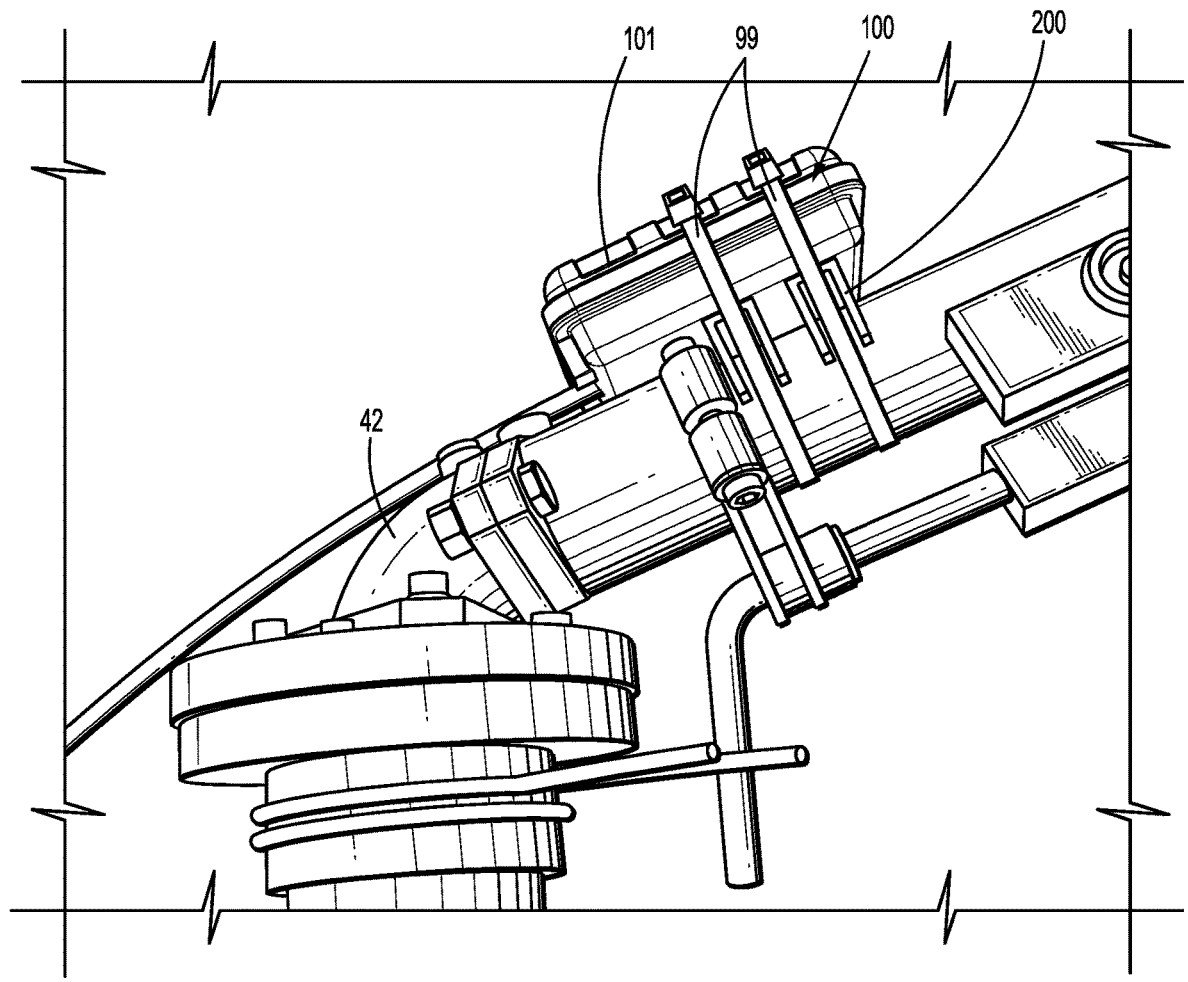
FIG. 2 is a perspective view illustrating a portion of an end gun system of the irrigation system of FIG. 1.

Aspects of the disclosed systems are described in detail with reference to the drawings, in which like reference numerals designate identical or corresponding elements in each of the several views. Directional terms such as front, rear, upper, lower, top, bottom, and the like are used simply for convenience of description and are not intended to limit the disclosure attached hereto.

In the following description, well-known functions or constructions are not described in detail to avoid obscuring the present disclosure in unnecessary detail.

Today, for potato or vegetable farms, a simple watering timer is used and if it is not reset on a ~30 min interval, the irrigation system infers there is a problem. There are also safety micro switches in each tower that open if a tower falls too far behind due to a drive system failure. At the control box, there is an encoder that provides angular position or linear position in the case of a linear system. The encoder can also be used in connection with a drip irrigation system. There is also a voltage measurement at the controller and a circuit breaker that can be monitored. This disclosure augments these measurements to provide more data to algorithms to better predict the system health.

Advantageously, the disclosed systems predict common unexpected downtime versus notification that a failure occurred after the fact. The disclosed systems provide better insight than a team driving around to observe operation, which can be subjective. Technology today only notifies of failure after the failure occurred, whereas the disclosed system predicts that maintenance is required before failure occurs.

Other diagnostic health measurements are "after-the-fact," logic-based, and/or do not attempt to assign a system health. These systems, while able to identify existing problems, also predict failures before they occur—like a check engine light for a car, or a digital twin for connected equipment. Further, while the disclosed systems are described herein in connection with irrigation for a potato or vegetable farm, these systems can be modified for any suitable farming operation requiring irrigation and can include drip irrigation, linear pivot system, and/or center pivot systems.

With reference to FIG. 1, a monitoring system for a farming irrigation system may be in the form of a predictive maintenance system of a center pivot irrigation system 20. Center pivot irrigation system 20 has a center pivot 22—located near a well or other source of water—, a radially extending conduit 24, and a series of drive towers 26 which support the conduit 24 and drive the system 20 in a circular path around center pivot 22. These drive towers 26 are generally electrically operated and include sensors and controllers (not shown) to maintain conduit 24 in an aligned condition as conduit 24 is generally constructed of a series of rigid sections of pipe 28 joined by flexible couplings 30. Conduits 24 include a plurality of sprinklers 46 for enabling water to be dispersed therefrom along a length of conduit 24. At the outermost end of conduit 24, and somewhere on the last section of pipe 28, one or more movable (e.g., pivotable) end guns 42 are mounted which are used to spray water beyond the end of the last section of pipe 28 so as to increase the number of acres (hectares) which can be irrigated with a given length of conduit 24. The irrigation system 20 includes any number of kinematic and telemetry components (e.g., computing/electronic devices and/or sensors) for monitoring a health of end gun 42. In aspects, the one or more sensors can include any suitable sensors such as, for example, an encoder (e.g., angular), pressure sensor, flow meter, magnetometer, gyroscope, accelerometer, camera, gesture sensor, microphone, laser range finder, reed/magnetic/optical switch, temperature sensor, GPS, etc., or combinations thereof.

For a more detailed description of components of a center pivot irrigation system 20, reference can be made, for example, to U.S. Pat. No. 4,249,698, the entire contents of which are incorporated by reference herein.

Figure 3:
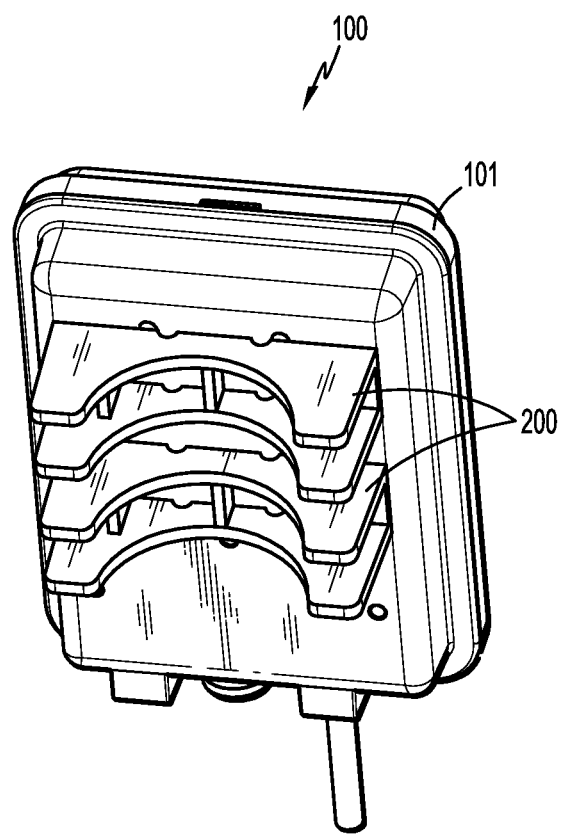
FIG. 3 is a bottom, perspective view of a modular kinematic and telemetry system of the end gun system of FIG. 2.
Figure 16:
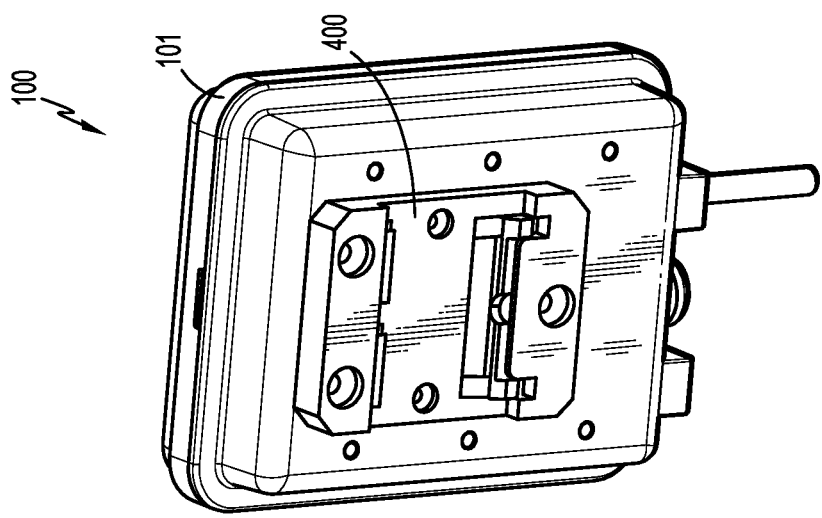
FIG. 16 is a bottom, perspective view of still another modular kinematic and telemetry system of the end gun system of FIG. 2.
Figure 15:
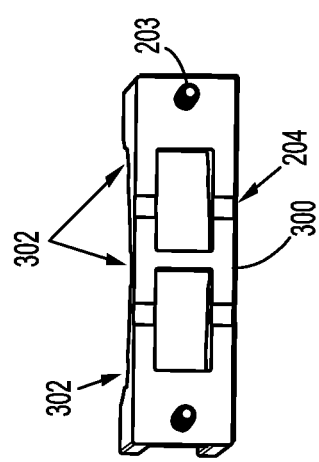

With reference to FIGS. 2-19, movable end gun 42 supports a modular kinematic and telemetry system 100 for monitoring movement of end gun 42 to determine whether end gun 42 requires maintenance. Modular kinematic and telemetry system 100 includes a CBM system 101 and one or more modular foot assemblies 200 (FIG. 3), 300 (FIG. 11), 400 (FIG. 16), one or more of which can be secured to CBM system 101 using any suitable securement technique (e.g., via welding, crimping, adhesives, snap-fit, and/or fasteners such as screws, etc.) for enabling CBM system 101 to be mounted to a plurality of different components of an irrigation system. For instance, one or more modular foot assemblies 200, 300, 400 enable CBM system 101 to be mounted onto to a plurality of different movable end guns 42 (e.g., retrofit), which may be provided in a variety of different configurations. CBM system 101 can be further secured to such movable end guns 42 via any suitable strap or tie 99.

Figure 4:
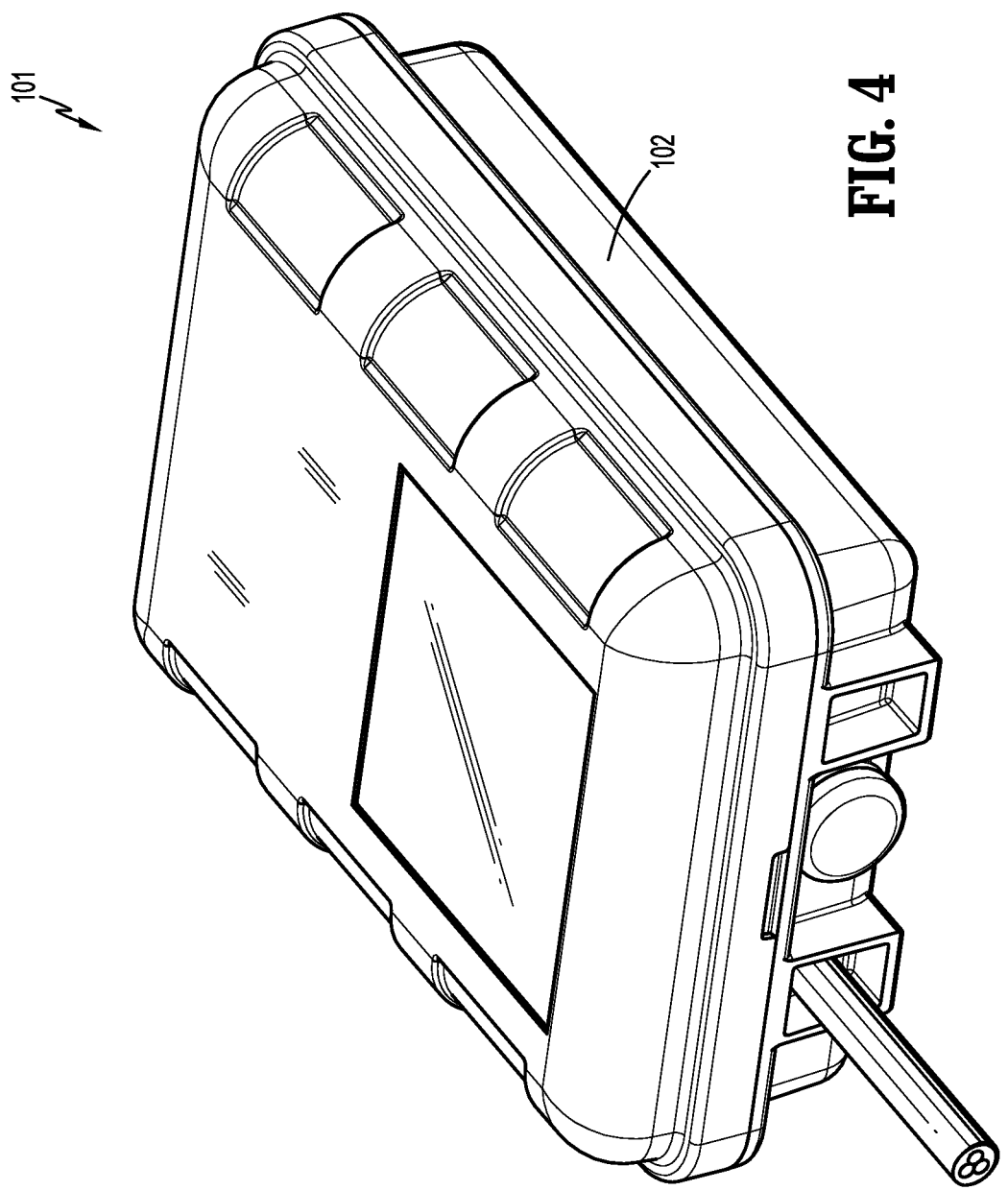
FIG. 4 is a top, perspective view of CBM system of the modular kinematic and telemetry system shown in FIG. 3.
Figure 5:
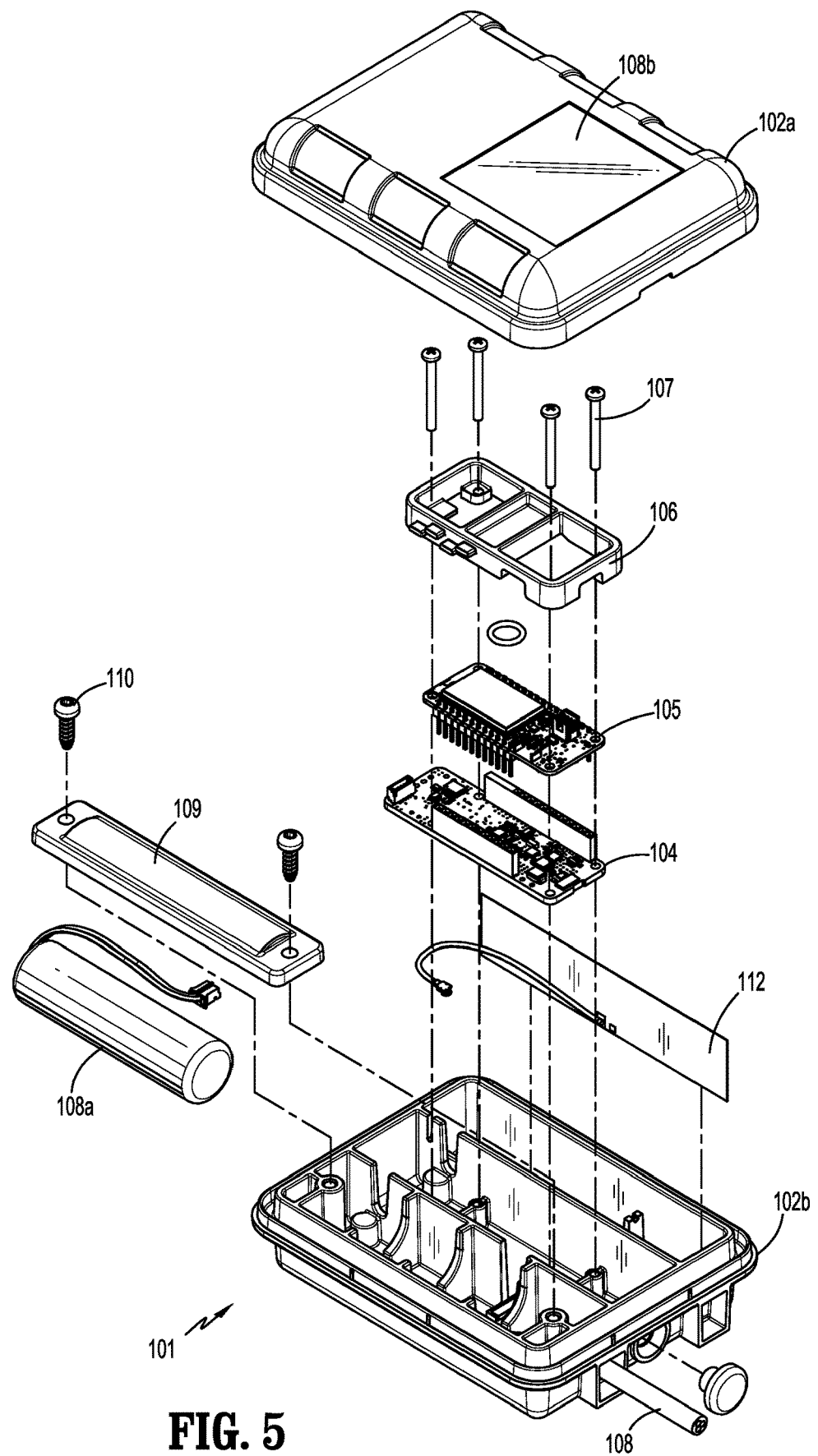
FIG. 5 is a perspective view, with parts separated, of the CBM system of FIG. 4.

As seen in FIGS. 4 and 5, CBM system 101 includes a housing 102 having an upper housing portion 102a and a lower housing portion 102b that support various electronic components therein. For example, housing 102 can support a controller 104, a sensor system 105 (e.g., at least one accelerometer, gyroscope, and/or magnetometer) and a mounting plate 106 that secures controller 104 and sensor 105 to housing 102 via fasteners 107. Housing 102 can further support a power and/or data line 108, battery 108a, and/or solar panel 108b. Battery 108a can be secured to housing 102 via a support plate 109 and fasteners 110. Also included in the housing 102 may be an antenna 112. Sensor system 105, power and/or data line 108, battery 108a, antenna 112, and solar panel 108b are configured to couple to controller 104 for operating CBM system 101.

For a more detailed description of components and operation of CBM system 101 or components thereof, reference can be made to U.S. Provisional Application No. 63/024,721, filed May 14, 2020, the entire contents of which are incorporated by reference herein.

Figure 6:
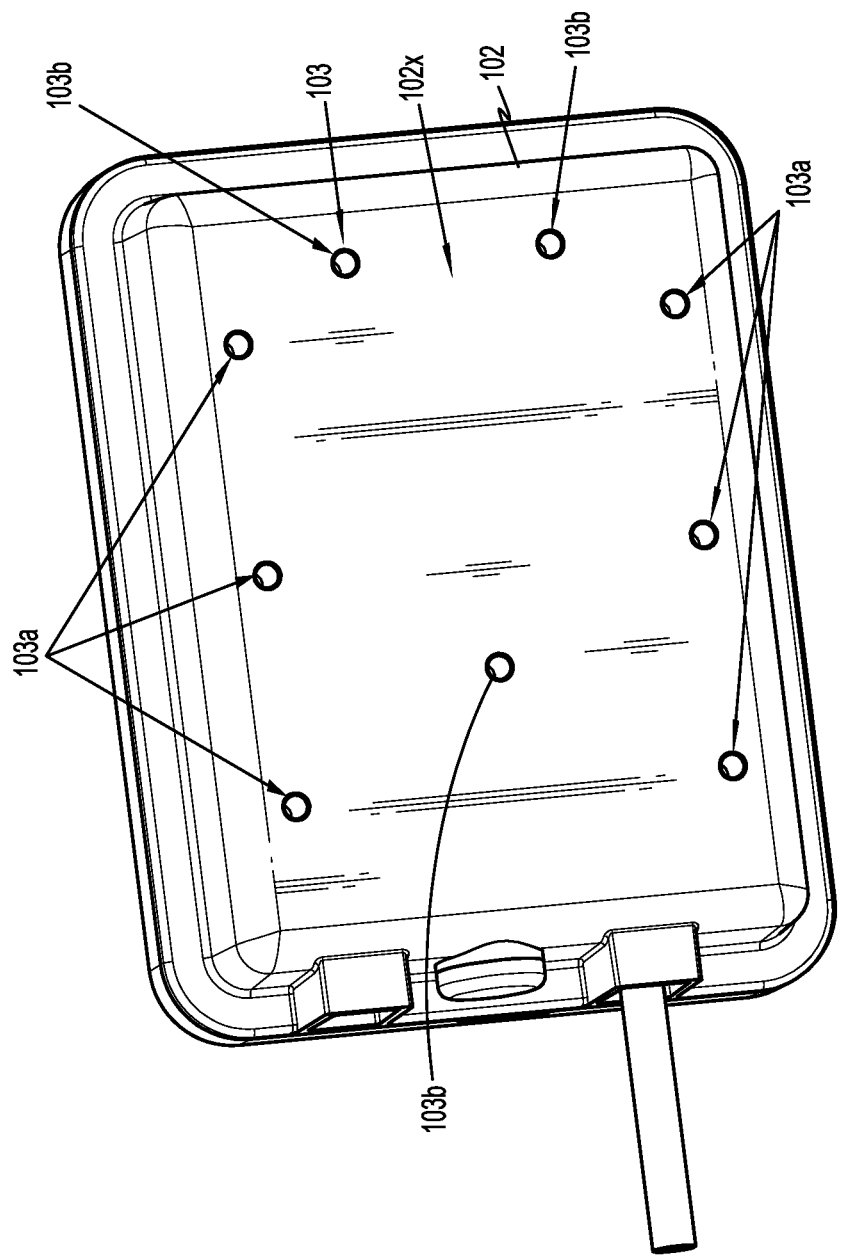
FIG. 6 is a bottom, perspective view of the CBM system of FIG. 4.
Figure 10:
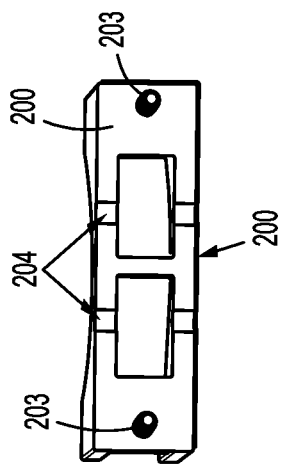
Figure 9:
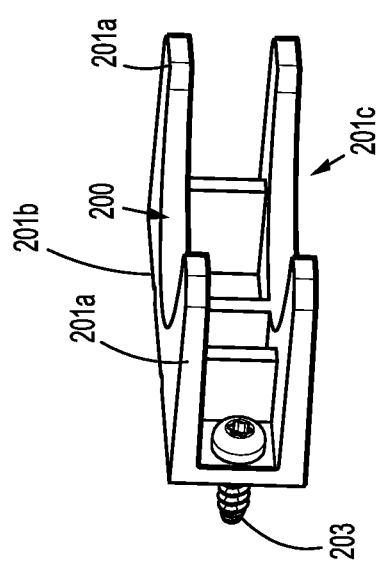
Figure 14:
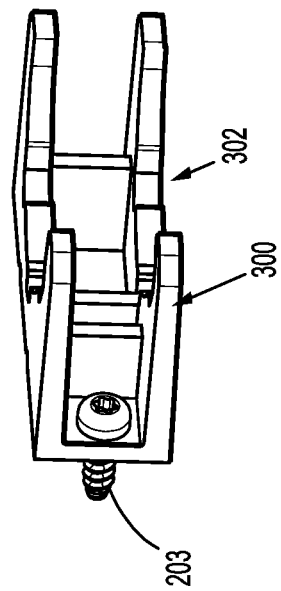
Figure 13:
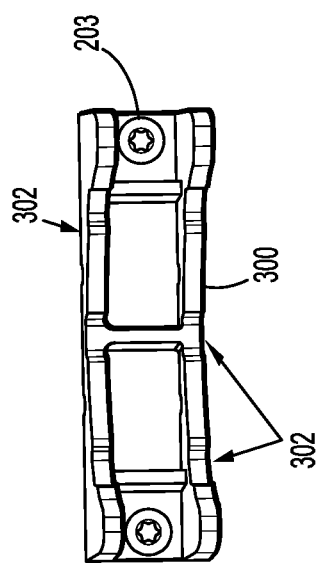

With reference to FIG. 6, a bottom surface 102x of housing 102, namely, lower housing portion 102b, defines a plurality of apertures 103 therethrough. Apertures 103 are configured to receive fasteners (e.g., screws 203; FIG. 7) therein to secure one or more foot assemblies, such as a plurality of foot assemblies 200, thereto. Apertures 103 includes outer apertures 103a for securing modular foot assemblies 200 (FIG. 7), 300 (FIG. 12) to housing 102 and inner apertures 103b for securing modular foot assembly 400 (FIG. 18) to housing 102.

Turning now to FIGS. 7-10, each modular foot assembly 200 of modular kinematic and telemetry system 100 includes a body portion 200a having an arched configuration. Body portion 200a includes legs 201a that are coupled together by a bridge 201b. Body portion 200a includes an arch 200x defined by an inner surface of legs 201a and a bottom surface of bridge 201b. Arch 200x defines a central passage 201c through body portion 200a that conforms to an outer surface of an end gun for supporting the CBM system 101 on the end gun. Arch 200x has a semi-circular configuration for mounting onto end gun 42. Body portion 200a defines fastener openings 202 therethrough that receive fasteners 203 for securing body portion 200a to CBM system 101. Body portion 200a further includes outer notches 204 defined in an outer surface of bridge 201b.

With reference to FIGS. 11-15, another modular kinematic and telemetry system 1000 is similar to modular kinematic and telemetry system 100, but includes a pair of modular foot assemblies 300 to enable CBM system 101 to be secured to certain end guns which may have different configurations than the end gun to which modular kinematic and telemetry system 100 couples. Each modular foot assembly 300 is similar to foot assembly 200, but includes inner notches 302 defined at spaced apart locations along arch 302x of foot assembly 300.

Turning now to FIGS. 16-19, still another modular kinematic and telemetry system 1001 includes a modular foot assembly 400 that is securable to CBM system 101 to secure CBM system 101 to various end guns which may have different configurations than the end guns to which modular kinematic and telemetry systems 100, 1000 couple. While modular kinematic and telemetry systems 100 and 1000 may require at least two foot assemblies to properly mount and balance CBM system 101 to a respective end gun, modular foot assembly 400 is a unitary mechanism that functions to properly mount and balance CBM system 101 onto an end gun.

Figure 17:
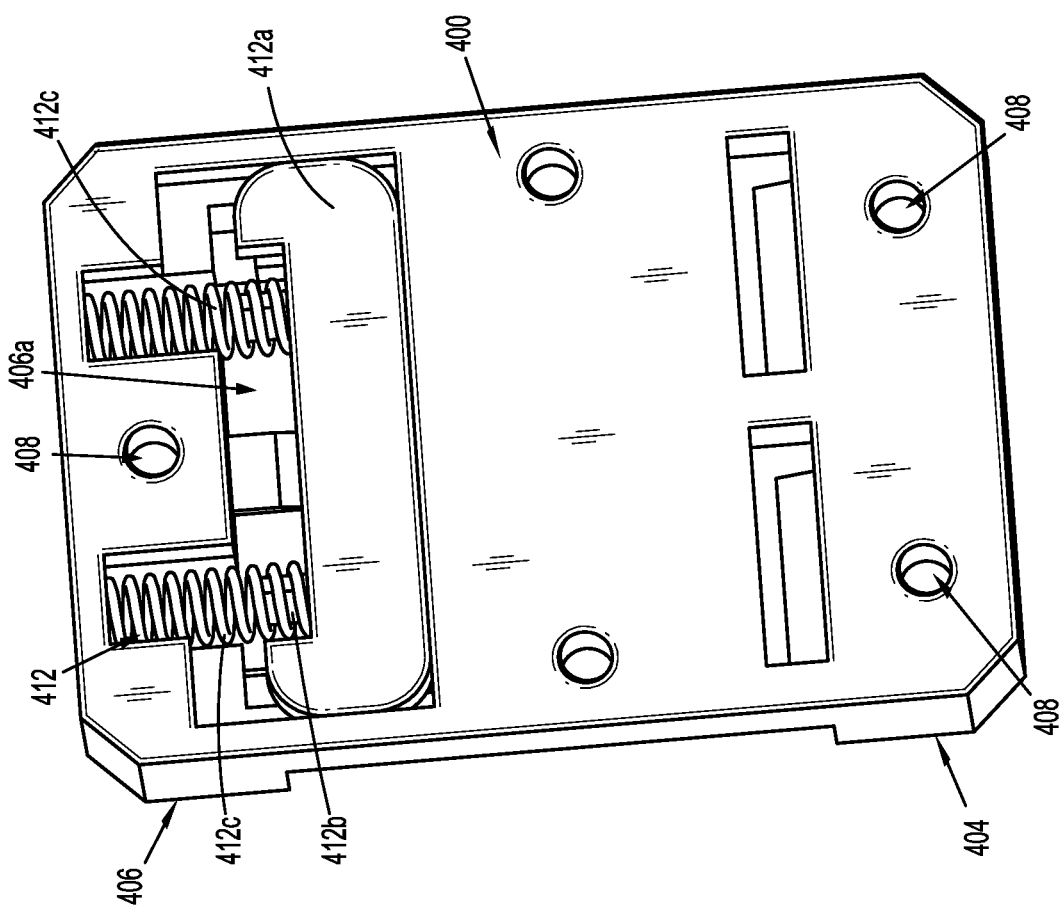
FIG. 17 is a top, perspective view of a foot assembly of the modular kinematic and telemetry system of FIG. 16.
Figure 18:
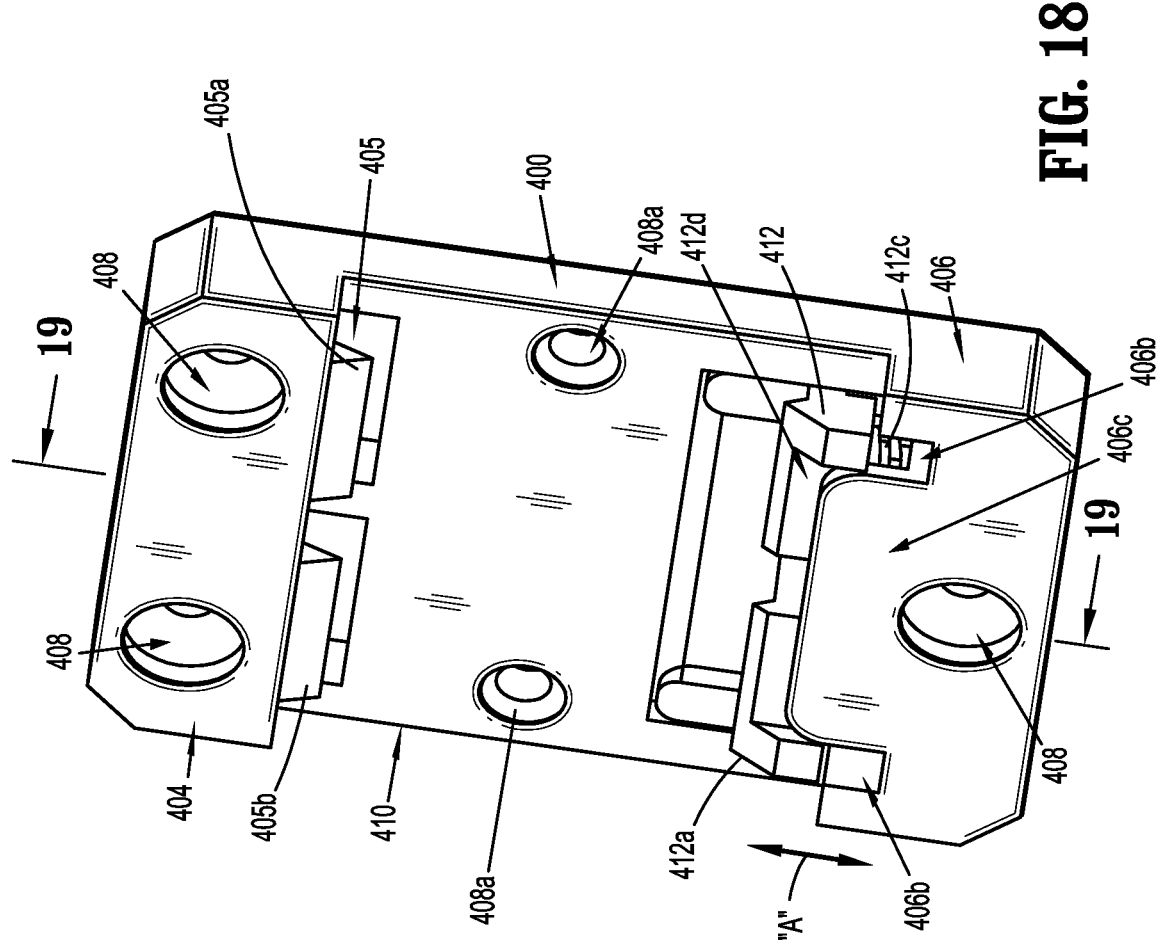
FIG. 18 is a bottom, perspective view of the foot assembly of FIG. 17.

As seen in FIGS. 17-19, modular foot assembly 400 includes a body portion 402 in the form of a plate. Body portion 402 includes a first end portion 404 and a second end portion 406. First end portion 404 and second end portion 406 define fastener apertures 408 therethrough for receiving fasteners therein to secure modular foot assembly 400 to inner apertures 103b of housing 102 of CBM system 101. Body portion 402 may further define supplemental apertures 408a therethrough for enabling additional fasteners to secure modular foot assembly 400 to CBM system 101. First end portion 404 further includes a fixed tooth assembly 405 extending from first end portion 404 toward second end portion 406 and into a channel 410 defined by body portion 402 between first and second end portions 404, 406. Fixed tooth assembly includes a first tooth 405a and a second tooth 405b that are spaced apart from one another. Second end portion 406 defines a tooth assembly cavity 406a and recesses 406b therein.

Second end portion 406 of modular foot assembly 400 supports an actuatable tooth assembly 412 that is movable relative to second end portion 406 between an extended position (FIG. 18) and a retracted position as indicated by arrow "A." Tooth assembly 412 includes a tooth bar 412a and tooth rods 412b extending from tooth bar 412a into tooth assembly cavity 406a of second end portion 406. Springs 412c are supported on tooth rods 412b to urge or bias tooth bar 412a to the extended position. Tooth bar 412a defines a lip channel 412d therethrough to enable tooth bar 412a to recess into tooth assembly cavity 406a as tooth assembly 412 is retracted into tooth assembly cavity 406a. Second end portion 406 further includes a lip portion 406c extending between and distally beyond (e.g., toward first end portion 404) recesses 406b of second end portion 406. In the extended position, tooth bar 412a extends distally beyond lip portion 406c and in the retracted position, tooth bar 412a is retracted from the extended position toward the lip portion 406c and into tooth assembly cavity 406a to enable modular foot assembly 400 (and thereby CBM system 101) to be selectively attached and/unattached to/from an end gun via actuatable tooth assembly 412 and fixed tooth assembly 405.

In general, the CBM system 101 includes various electronic or computing devices and/or sensors that perform functions including signal processing, sensor calibration, power management, end gun operational report, end gun health alerts, end gun characterization, watchdog, bootloader, and a state machine. The CBM module generally includes a microcontroller (e.g., an STM32 microcontroller), a regulator, one or more UARTs, analog and/or digital inputs and outputs, a programming header (e.g., SWD and/or JTAG), status LED (e.g., status LED blue, error LED red), flash memory, an impact sensor, an inertial measurement unit (IMU). The application firmware and a bootloader firmware run on the microcontroller. The CBM module may be powered via an external power supply and/or a battery. In some aspects, the power supply can include any number of solar panels/photovoltaic structure. The battery may be internal, supported within the housing of the CBM system and/or external thereto. An IMU is an electronic device that measures and reports a body's specific force, angular rate, and sometimes the orientation of the body, using a combination of accelerometers, gyroscopes, and/or magnetometers. The signal processing functions include, for example, logic to: detect when the end gun starts and/or stops, determine the number of degrees (both forward and reverse degrees) the end gun has traveled based on an onboard compass, detect the average peak forward and/or reverse angular rate based on an onboard gyro, determine the average forward and reverse time, determine a forward to reverse time ratio, determine the time to trip the reversing lever for the end gun (for example, to notify the system if the unit is getting hung up and is taking too long to reverse direction), drive arm forward and/or reverse frequency based on the accelerometer and/or the gyro.

The CBM system 101 generally includes a first cloud server (e.g., a Heartland Farm cloud) which includes an interface for the system, a device cloud (e.g., a Particle cloud) configured for communication between connected devices and the system, and a firmware server, which is configured to push firmware updates to components of the system. System devices may include a cellular enabled microcontroller (e.g., a Particle Boron) and a CBM module. The cellular enabled microcontroller includes a cellular receiver/transmitter/, a wireless receiver/transmitter (e.g., Bluetooth and/or WIFI), power management functions, firmware update functions, watchdog functions, power management integrated circuits (PMIC), power on-self test (POST) functions, a universal asynchronous receiver/transmitter (UART), and a general-purpose IO (GPIO). The cellular enabled microcontroller communicates with the condition-based monitor module (CBM module) which is configured for processing signals from sensors. The sensor signals can be sampled by the CBM module at a rate of 1125 KHz, for example. When the CBM module determines one or more operations are completed, the CBM module notifies the system via the cellular enabled microcontroller.

As can be appreciated, any the disclosed electronic and/or computing devices and/or sensors of the CBM system can electrically couple to a circuit via wired or wireless connection configured to generate an electrical signal indicative of movement and/or positioning (e.g., acceleration, speed, distance, location, etc.) of the movable end gun relative to the pivot over time (seconds, minutes, hours, days, years, etc.). These devices are configured to receive the electrical signal and determine whether the movable end gun requires maintenance based on the electrical signal. The controller can send a signal and/or alert indicating the health of the end gun and/or whether maintenance is required thereon based on predetermined data or thresholds which may be part of a database, program and/or stored in memory (e.g., supported on the circuit, in the cloud, on a network, server, etc.). Indeed, these devices may be in the form of a smart end gun for end gun monitoring, may operate using any suitable number or type of analytics and/or logic approaches such as control charting, machine learning ("ML") anomaly detection, parameter limit alarms, etc.

The terms "artificial intelligence," "data models," or "machine learning" may include, but are not limited to, neural networks, deep neural networks, recurrent neural networks (RNN), generative adversarial networks (GAN), Bayesian Regression, Naive Bayes, Monte Carlo Methods, nearest neighbors, least squares, means, and support vector regression, among other data science, artificial intelligence, and machine learning techniques. Exemplary uses are identifying patterns and making predictions relating to the health or status of one or more components (e.g., end gun) of the disclosed monitoring systems.

The term "application" may include a computer program designed to perform particular functions, tasks, or activities for the benefit of a user. Application may refer to, for example, software running locally or remotely, as a stand-alone program or in a web browser, or other software which would be understood by one skilled in the art to be an application. An application may run on the disclosed controllers or on a user device, including for example, on a mobile device, an IOT device, or a server system.

The monitoring system may monitor the health or status of one or more components (e.g., pivot, end gun, etc.) the disclosed monitoring systems using at least one machine learning algorithm. For example, the disclosed monitoring systems may use machine learning in order to increase the statistical probability that the health of one or more components is healthy, failing, is about to fail, has failed and/or will fail within an expected time frame or usage, etc.

In various embodiments, the neural network may include a temporal convolutional network or a feed-forward network. In various embodiments, the neural network may be trained using one or more of measuring sensor data or identifying patterns in data. In various embodiments, training the machine learning algorithm may be performed by a computing device outside of the monitoring system (e.g., a remote computing device or network), and the resulting algorithm may be communicated to the controller of the monitoring system.

In one aspect of the present disclosure, the algorithms in the present disclosure may be trained using supervised learning. Supervised learning is the machine learning task of learning a function that maps an input to an output based on example input-output pairs. It infers a function from labeled training data consisting of a set of training examples. In supervised learning, each example is a pair consisting of an input object (typically a vector) and a desired output value (also called the supervisory signal). A supervised learning algorithm analyzes the training data and produces an inferred function, which can be used for mapping new examples. In various embodiments, the algorithm may correctly determine the class labels for unseen instances. This requires the learning algorithm to generalize from the training data to unseen situations in a "reasonable" way.

In various embodiments, the neural network may be trained using training data, which may include, for example, different soil conditions or different component characteristics (e.g., current, voltage, pressures, duty, etc.). The algorithm may analyze this training data and produce an inferred function that may allow the algorithm to identify component failures or changes in health, based on the generalizations the algorithm has developed from the training data. In various embodiments, training may include at least one of supervised training, unsupervised training, or reinforcement learning.

In various embodiments, the neural network may include, for example, a three-layer temporal convolutional network with residual connections, where each layer may include three parallel convolutions, where the number of kernels and dilations increase from bottom to top, and where the number of convolutional filters increases from bottom to top. It is contemplated that a higher or lower number of layers may be used. It is contemplated that a higher or lower number of kernels and dilations may also be used.

In aspects, the disclosed monitoring systems can be a separate system that can be selectively attached or retrofit to an end gun, or in some aspects, the monitoring system can be built directly into an end gun.

As can be appreciated, securement of any of the components of the disclosed apparatus can be effectuated using known securement techniques such welding, crimping, gluing, fastening, etc.

Persons skilled in the art will understand that the structures and methods specifically described herein and illustrated in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. A modular kinematic and telemetry system for an irrigation system, the modular kinematic and telemetry system comprising:
a condition-based monitoring (CBM) system having a housing and supporting a plurality of kinematic and telemetry components; and
a plurality of sets of modular foot assemblies including a first set and a second set that secure to the housing of the CBM system, the first set configured to secure the CBM system to a first end gun configuration and the second set configured to secure the CBM system to a second end gun configuration that is different from the first end gun configuration, the first set having a first configuration and the second set having a second configuration, the first and second configurations being different, the first set including at least two foot assemblies, each foot assembly including a body portion having a plurality of legs coupled together by a bridge, the bridge defining at least one notch therein, the body portion including an arch that defines a central passage through the body portion, the central passage configured to conform to an outer surface of an end gun of the irrigation system for supporting the CBM system on the end gun.

2. The modular kinematic and telemetry system of claim 1, wherein the at least one notch includes an outer notch defined in an outer surface of the bridge.

3. The modular kinematic and telemetry system of claim 1, wherein the plurality of sets of modular foot assemblies further includes a third set that is different than the first and second sets, wherein the first, second, and third sets are each selectively securable to the CBM system via fasteners, wherein the CBM system is configured to support only one of the first, second, or third sets at a given time for selectively securing the CBM system to an end gun of the irrigation system, wherein the first set conforms to the end gun when the end gun has a first configuration, the second set conforms to the end gun when the end gun has a second configuration, and the third set conforms to the end gun when the end gun has a third configuration.

4. The modular kinematic and telemetry system of claim 2, wherein the at least one notch includes an inner notch defined in an inner surface of the bridge that defines the arch of the bridge.

5. A modular kinematic and telemetry system for an irrigation system, the modular kinematic and telemetry system comprising:
a condition-based monitoring (CBM) system having a housing and supporting a plurality of kinematic and telemetry components; and
a plurality of sets of modular foot assemblies including a first set and a second set that secure to the housing of the CBM system, the first set configured to secure the CBM system to a first end gun configuration and the second set configured to secure the CBM system to a second end gun configuration that is different from the first end gun configuration, the second set including a plate having a first end portion and a second end portion on opposite ends of the plate, the first end portion having a fixed tooth assembly and the second end portion having an actuatable tooth assembly.

6. The modular kinematic and telemetry system of claim 5, wherein the actuatable tooth assembly includes a tooth bar that is movable relative to the second end portion of the plate between an extended position and a retracted position to selectively secure the CBM system to an end gun of the irrigation system.

7. The modular kinematic and telemetry system of claim 5, wherein the first set includes a foot assembly having a bridge.

8. The modular kinematic and telemetry system of claim 7, wherein the bridge includes an arch.

9. The modular kinematic and telemetry system of claim 7, wherein the bridge defines a notch therein.

10. The modular kinematic and telemetry system of claim 9, wherein the notch is defined in an outer surface of the bridge.

11. The modular kinematic and telemetry system of claim 9, wherein the notch is defined in an inner surface of the bridge.

12. A modular kinematic and telemetry system, comprising:
a first modular foot assembly configured to couple to a first end gun;
a second modular foot assembly that has a different configuration than the first modular foot assembly and configured to couple to a second end gun that has a different configuration than the first end gun; and
a condition-based monitoring (CBM) system having a housing, the housing having an upper housing portion and a lower housing portion that support a plurality of kinematic and telemetry components therebetween, the CBM system configured to couple to only one of the first or second modular foot assemblies at a given time for selectively securing the CBM system to one of the first or second end guns at the given time, the first modular foot assembly including a body portion having a plurality of legs coupled together by a bridge, the body portion including an arch that defines a central passage through the body portion, the bridge defining at least one notch therein.

13. The modular kinematic and telemetry system of claim 12, wherein the at least one notch includes an outer notch defined in an outer surface of the bridge.

14. The modular kinematic and telemetry system of claim 13, wherein the at least one notch includes an inner notch defined in an inner surface of the bridge that defines the arch of the bridge.

15. A modular kinematic and telemetry system, comprising:
a first modular foot assembly configured to couple to a first end gun;
a second modular foot assembly that has a different configuration than the first modular foot assembly and configured to couple to a second end gun that has a different configuration than the first end gun; and
a condition-based monitoring (CBM) system having a housing, the housing having an upper housing portion and a lower housing portion that support a plurality of kinematic and telemetry components therebetween, the CBM system configured to couple to only one of the first or second modular foot assemblies at a given time for selectively securing the CBM system to one of the first or second end guns at the given time, the second modular foot assembly including a plate having a first end portion and a second end portion on opposite ends of the plate, the first end portion having a fixed tooth assembly and the second end portion having an actuatable tooth assembly.

16. The modular kinematic and telemetry system of claim 15, wherein the actuatable tooth assembly includes a tooth bar that is movable relative to the second end portion of the plate between an extended position and a retracted position.

17. The modular kinematic and telemetry system of claim 15, wherein the first modular foot assembly includes a foot assembly having a bridge.

18. The modular kinematic and telemetry system of claim 17, wherein the bridge includes an arch.

19. The modular kinematic and telemetry system of claim 17, wherein the bridge defines at least one notch therein.

20. The modular kinematic and telemetry system of claim 19, wherein the at least one notch includes a first notch defined in an outer surface of the bridge and a second notch defined in an inner surface of the bridge.

* * * * *